United States Patent [19]

Blades

[11] 4,315,325

[45] Feb. 9, 1982

[54] ECHO RANGING PULSE DISCRIMINATION CIRCUIT

[75] Inventor: Frederick K. Blades, Boulder, Colo.

[73] Assignee: PureCycle Corporation, Boulder, Colo.

[21] Appl. No.: 165,254

[22] Filed: Jul. 2, 1980

[51] Int. Cl.³ .............................................. G01S 15/04
[52] U.S. Cl. ................................ 367/98; 343/5 SM; 364/517; 367/900
[58] Field of Search ................ 367/98, 900; 364/516, 364/517; 343/5 SM; 73/609

[56] References Cited

U.S. PATENT DOCUMENTS

| | | | |
|---|---|---|---|
| 4,000,650 | 1/1977 | Snyder | 73/290 V |
| 4,023,168 | 5/1977 | Bruder et al. | 343/5 SM |
| 4,079,376 | 3/1978 | Kirk, Jr. | 343/5 SM |
| 4,145,741 | 3/1979 | Nappin | 364/516 |
| 4,169,263 | 9/1979 | Hooker, Jr. | 343/5 SM |

Primary Examiner—Richard A. Farley
Attorney, Agent, or Firm—Woodcock, Washburn, Kurtz, Mackiewicz & Norris

[57] ABSTRACT

An improved echo ranging system is disclosed which features improved circuitry for discrimination of received reflected pulses from noise. Discrimination is performed by comparison of the input pulses to a time-varying threshold voltage wherein the threshold function varies in accordance with the predicted attenuation of the transmitted echo signal over its path. In this way, variable gain elements used to amplify the received signal prior to comparison it with a fixed threshold height can be eliminated, thus rendering the circuitry less complicated, expensive, and calibration free.

6 Claims, 6 Drawing Figures

ECHO RANGING PULSE DISCRIMINATION CIRCUIT

FIELD OF THE INVENTION

The present invention relates to a novel means for discrimination of received pulses from extraneous noise in echo ranging systems. More particularly, an improved method is disclosed for simultaneously providing the functions of time-varied gain, full wave rectification, threshold detection and logic level conversion in a simple and calibration-free circuit.

BACKGROUND OF THE INVENTION

Echo ranging, often referred to as echo location or echo sounding, is well known in the prior art as a non-contact distance measuring method. Ultrasonic systems have found application in liquid and solid particulate level monitoring, flow rate monitoring, camera range-finding and numerous other short-range distance measuring systems. Radio frequency systems have found use in both high resolution and long-range measurement systems.

Echo ranging systems transmit a discrete burst of pulses towards the reflective object the distance of which from the source is to be measured. Following reflection, the echo is received and the elapsed time between transmission of the burst and reception of the echo is noted. Assuming a homogeneous propagation medium, the measured distance is directly proportional to this elapsed time.

Common to all such systems is a circuit for detection of the received echo including a discriminator for differentiating between actual echoes and acoustic and/or electronic noise. Typically this is accomplished by feeding the received signal through one or more stages of amplification and/or filtering to discriminate the desired signal followed by a rectification (detection) stage. The unipolar signal is then compared to a preset noise threshold to indicate the reception of a valid echo.

In many applications, the gain must be time-varied to compensate for transmission losses. While in radar systems, the medium is essentially lossless, so that signal attenuation is solely a function of the fourth power of the distance traversed, in ultrasonic systems the attenuation is a function of both the medium and the wave distribution and the signal is rapidly attenuated. In either case, the attenuation versus the time (distance) function is predictable and can thus be compensated for by increasing the receiver gain with time, according to the inverse function; the amplified signal is then compared to a fixed threshold for discrimination.

Examples of this method can be found in the prior art. One such system employing time varying gain is described in U.S. Pat. No. 4,000,650, issued to Ellery P. Snyder, Mar. 20, 1975. Several disadvantages are unavoidable with such an approach. Generally a DC control voltage is applied to a voltage-variable gain stage to implement the time varying gain function. Such a stage is constructed with the use of a circuit element whose resistance or effective transconductance is varied by the DC control voltage. Presently available elements share common problems of nonlinearity, limited dynamic range and relatively high cost. Additionally most such elements require calibration to offset the wide initial transfer function tolerance.

Another method, described in U.S. Pat. No. 4,145,741, issued to Donald Nappin, Mar. 20, 1979 described a system employing log amplifiers to effectively subtract the log of the attenuation function from that of the received signal. Although some advantages are gained from such a method, the cost and complexity of suitable circuitry are again relatively high.

OBJECTS OF THE INVENTION

It is therefore an object of the present invention to provide an improved and more economical method for compensating transmission losses in echo ranging systems.

It is a further object of the present invention to provide an economical circuit means for simultaneously performing the functions of time varied gain, full wave rectification and threshold detection in echo ranging systems.

It is a further object of the present invention to provide a calibration-free, time-varied gain signal detection means in echo ranging systems.

An ultimate object of the present invention is to provide an improved echo ranging system.

SUMMARY OF THE INVENTION

In accordance with the present invention, a circuit is disclosed in connection with an ultrasonic ranging system which provides the function of time-varied gain, full-wave rectification, threshold detection and logic level conversion with no calibration requirements.

In contrast to the conventional method of time varying the gain of an amplification stage prior to comparison with a fixed-height threshold, the circuit of the present invention varies the height of the threshold as a function of time, thereby avoiding the problems caused by attempting to accurately vary the gain of an amplifying element. Further, the polarity of the threshold voltage is alternated in response to the input signal polarity; i.e., each excursion of the AC input signal above the time-varying threshold level causes the threshold to switch to the opposite polarity, so the output of the comparator is effectively full-wave rectified.

DESCRIPTION OF THE PREFERRED EMBODIMENTS

Figure 3:
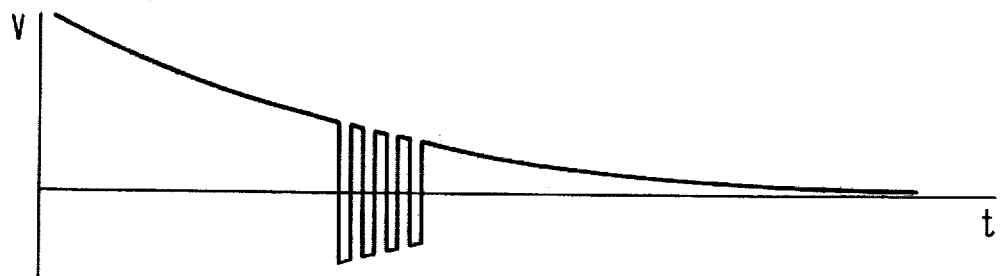
Figure 4:
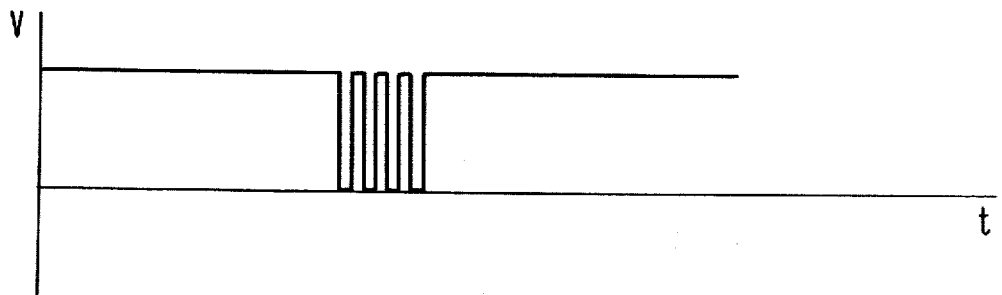
Figure 5:
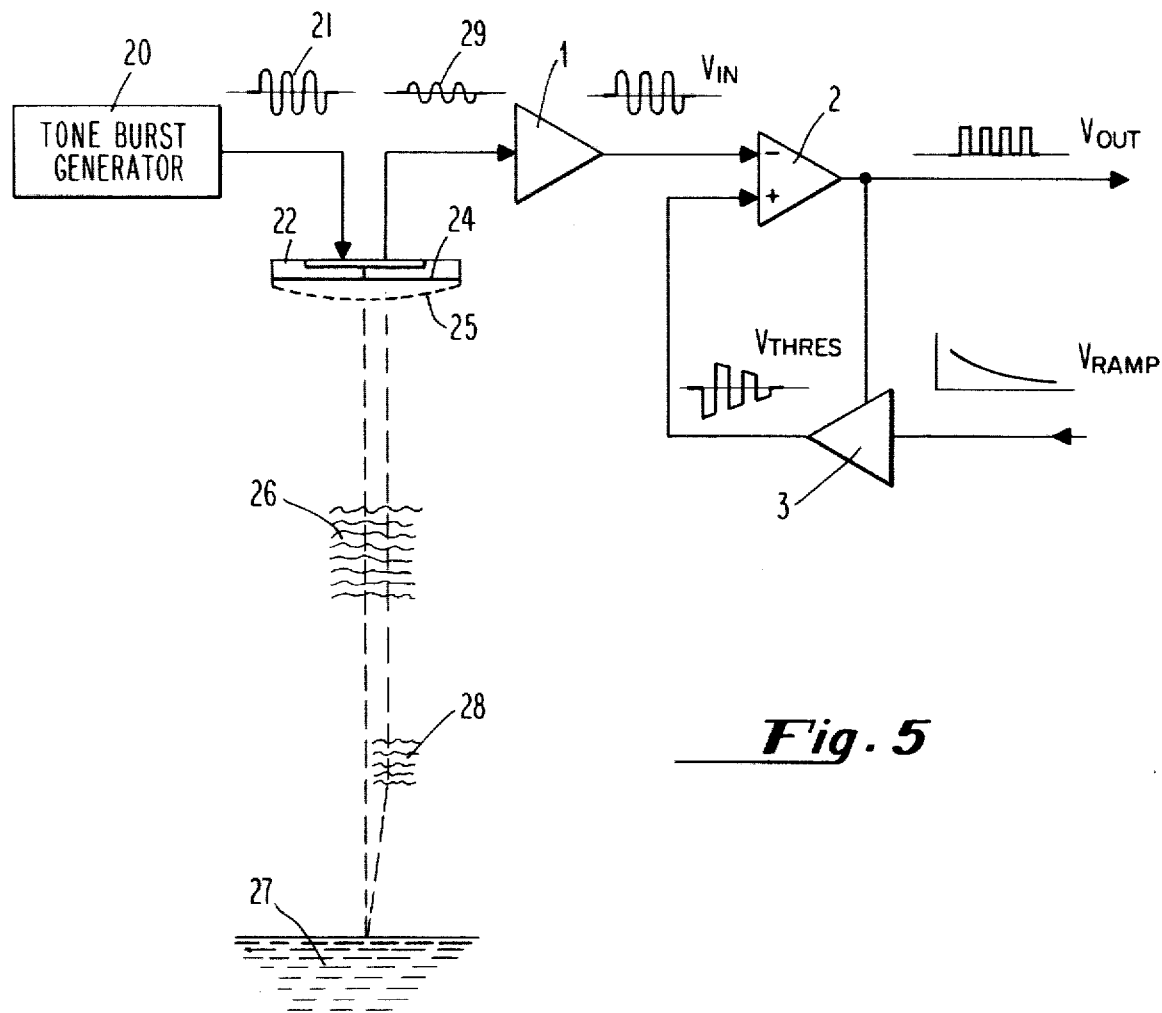
FIG. 5 is a block diagram of an ultrasonic ranging system comprising a detection circuit in accordance with the teachings of the present invention.
Figure 6:
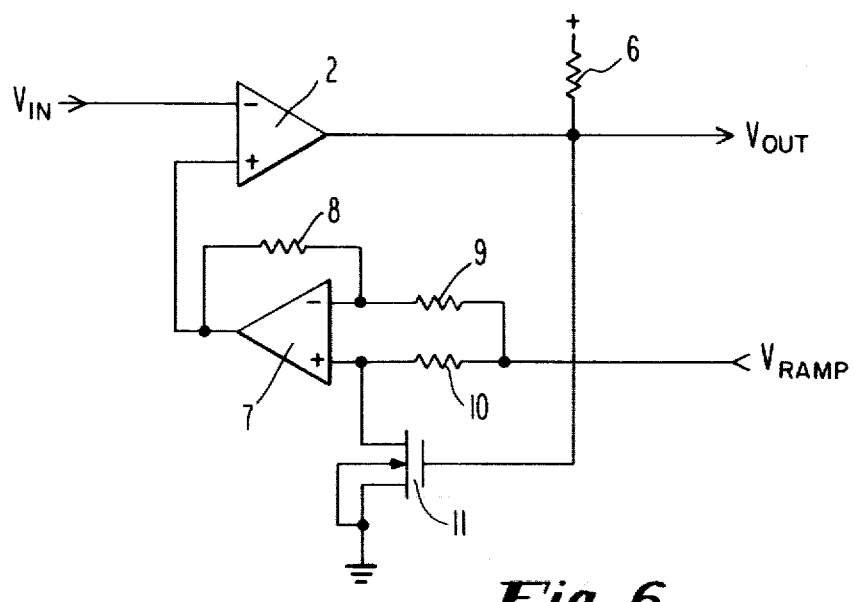
FIG. 6 is a schematic diagram of the preferred embodiment of the circuitry of the present invention.

The operation of the present invention will be more fully understood with reference to the time functions illustrated in FIGS. 1-4, and the block and circuit diagrams of FIGS. 5 and 6, respectively.

Figure 1:
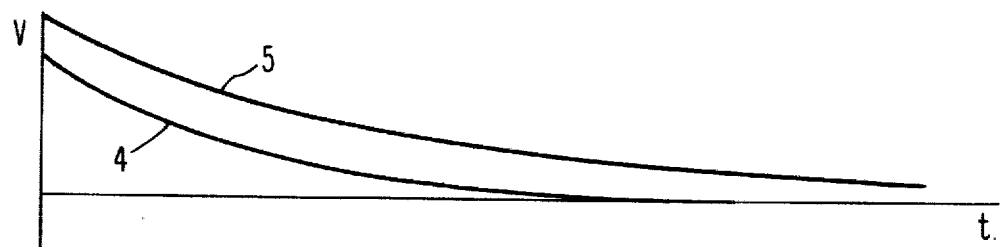
FIGS. 1-4 are plots in the time domain of a received echo signal as processed by the circuit of the invention.

FIG. 1 shows a typical ramp function used to set the height of the discrimination threshold, in this case representing the expected return amplitude versus time in an ultrasonic level sensing apparatus. As can be seen, the amplitude is initially high and falls off rapidly with time as the transmitted burst is attenuated as it travels. The actual level of the threshold ramp voltage 4 to be fed to the discrimination circuit is set to be a fraction of the minimum expected return amplitude 5 to insure triggering of the circuit. Usually this fraction is on the order of ½, though this may vary with the needs of the particular application, and the usual noise levels encountered.

Figure 2:
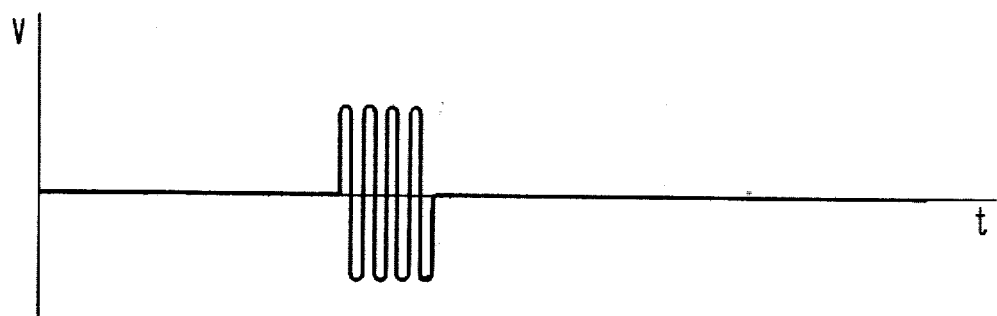

Referring now to FIG. 2, a typical return signal is illustrated. The cycle time is exaggerated with respect to the ramp function of FIG. 1, and only four cycles are shown for purposes of clarity. In practice more cycles would generally be used and the cycle time would be a fraction of what is shown relative to the ramp function. The length of the received burst would be such that the ramp function would be substantially unchanged for its duration.

FIG. 3 illustrates the principal function of the circuit of the invention. When the first half-cycle of the signal amplitude exceeds the threshold voltage, the polarity of the threshold ramp function of FIG. 1 is inverted. The second half-cycle of the signal must now exceed the threshold going in the opposite polarity. When this occurs, the threshold switches back to the original polarity. This proceeds until the entire signal has been processed.

Thus both halves of each received cycle must be present for the circuit to process the signal, providing a first noise discrimination function. It will be apparent to one versed in the art that comparison of the threshold signal, thus polarity-reversed, with the input signal, effectively provides the function of full-wave rectification to the comparator output.

FIG. 4 shows the output signal derived from a comparator which compares the threshold signal with the received signal. This signal level is amplitude-independent of the input signal, being logic-level, and can be made level-compatible with any further processing circuitry.

Referring now to FIG. 5, an overall view of an ultrasonic ranging system comprising the circuitry according to the invention is shown. When measurement is desired a tone burst generator 20 is energized by means (not shown) to generate an input burst 21 and apply this to an ultrasonic transducer 22. This transducer 22 may comprise an electrostatic diaphragm 24 and conductive plate 23. As is well known in the art, such transducers when energized by an input burst 21 vibrate at the frequency of the input burst. The diaphragm may be protected by a perforated guard 25. The output burst is transmitted perpendicularly away from the surface of the diaphragm 24 as indicated generally at 26, and reflects off whatever first obtrudes its path such as a liquid indicated at 27. The return signal somewhat attenuated as indicated at 28 excites the diaphragm 24 which causes the transducer 24 to output a signal 29 similar in shape to the input signal 21 but attentuated proportional to the distance traveled by the output burst 26 and the return burst 28. In some cases, such as where the ultrasonic transducer 22 of the piezoelectric type is to be used to measure the level of a liquid, it may advantageously be installed in a tube which serves to better couple the ultrasonic transducer to the liquid level thus limiting the power requirements of the ultrasonic system and preventing it from responding due to ripples in the liquid.

The signal burst 29 returned from the ultrasonic transducer 22 is fed into one or more stages of amplification 1 to bring the level to within the dynamic range of a comparator circuit 2. An externally generated ramp voltage $V_{ramp}$, representing the inverse attenuation function of the reflected signal and varying with time, i.e. the threshold level, is fed through a unity gain, programmable polarity threshold amplifier 3 to the comparator 2. When a positive input signal exceeds the threshold level then being fed to the comparator 2, it switches "low" thereby causing the threshold amplifier 3 to switch polarity and invert the threshold to a negative value. The input signal $V_{in}$ will next reach the same absolute value of the threshold level $V_{thres}$ but with a negative excursion of the input signal. Thus a feedback loop is established which constantly switches the polarity of the threshold voltage in response to the incoming polarity shifts of the signal. The output of the comparator 2 $V_{out}$ is thus a rectified unipolar pulse train of uniform logic level amplitude well suited for future processing. Further, the threshold voltage is made to time vary (generally decreasing with time) to compensate for attenuation of the echo signal with time (distance).

Referring now to FIG. 6, a preferred embodiment of circuitry according to the present invention is illustrated in schematic form.

The input signal, following one or more stages of amplification (not shown) is fed into the inverting input of a standard comparator 2. The comparator is an open-collector output type with a pullup resistor 6 to the +5 volt level for logic compatibility. Resistors 8, 9 and 10, operational amplifier 7 and n-channel MOSFET 11 form a programmable polarity unity gain stage. When the output of the comparator 2 is off (high), the transistor 11 is "on" pulling the positive input of the amplifier 7 to ground. Thus, as resistor 8 is equal in value to resistor 9, the stage functions as a unity gain inverting amplifier. When the comparator 2 is switched "on" (low) by polarity inversion of the input signals, the transistor 11 turns "off" forcing the positive input to follow the input signal. The stage now functions as a non-inverting unity gain amplifier.

Thus with the output of the amplifier 7 fed into the non-inverting input of the comparator 2, the feedback loop is established and the circuit performs as previously described to provide a rectified, logic level pulse train having a frequency equal to that of the transducer's output burst.

It will be appreciated that there has been described an echo ranging circuit suitable for use in ultrasonic and other applications which provides compensation for attenuation of the transmitted and reflected signals while providing a threshold voltage for comparison so as to discriminate noise from valid signals. By varying the threshold voltage rather than the amount of amplification applied to the input signal the design of the circuitry and the cost of the components required can be greatly simplified while the calibration required by prior art circuits can be eliminated.

It will further be appreciated by those skilled in the art that the echo ranging system and improved circuitry disclosed above has wide applicability. It is useful in, for example, machine control applications, as well as in ultrasonic systems for measuring the level of fluids or materials within vessels and can operate both in the air and under water or in other fluids, while the signals can be relatively low frequency ultrasonic or other acoustic signals or can be high frequency radio waves. In all these cases the circuit of the invention is of utility in discriminating validly reflected received signals from noise and providing rectified logic level output signals for use by circuitry for providing an indication of the distance between the transducer and the object from which the transmitted wave is reflected.

Furthermore, those skilled in the art will recognize that numerous modifications to the specific circuitry shown are possible without departure from the scope of the present invention. For example, it would be possible to invert the incoming signal rather than the threshold signal when the two coincide rather than vice-versa; those skilled in the art would have no difficulty in altering the circuitry shown to achieve this goal. Therefore, the above description of the invention and the system in which it is used should not be construed as a limitation of the invention which is more properly defined by the following claims.

I claim:

1. An echo ranging system comprising:
   means for generating and transmitting a pulse;
   means for receiving a reflection of said transmitted pulse and converting said reflection into an input signal; and
   circuit means for discriminating said received pulse from noise and for providing a signal in response to said received pulse, said circuit comprising:
   means for providing a threshold level varying with time, means for comparing said input signal to said threshold level, means for providing an output signal when said input signal exceeds said threshold level and means for inverting the relative polarity of said threshold level with respect to said input signal when said input signal exceeds said threshold level.

2. The system of claim 1 in which said threshold level is attenuated in accordance with attenuation of said transmitted pulse in the interval between its transmission and reception.

3. A circuit for discrimination of received pulses from echo ranging apparatus from noise, comprising:
   means for converting said received pulses into an input signal;
   means for providing a time-variant threshold signal;
   means for comparing said time-variant threshold with said input signal;
   means for inverting the polarity of said threshold signal in synchronism with changes in polarity of said input signal; and
   means for outputting a signal indicative of reception of said signal when said comparison means indicates that said input signal is a predetermined fraction of said threshold signal.

4. The circuit of claim 3 wherein said threshold signal is time-varied to present a lowering threshold to said means for comparing.

5. Method of discriminating a received pulse from echo ranging means from noise comprising the steps of:
   providing a time-variant threshold function;
   applying said threshold function to comparator means;
   comparing the amplitude of said received pulse with said threshold signal; and
   outputting a signal indicative of the receipt of a reflected echo pulse when said threshold is exceeded by said received pulse by a predetermined multiple of its height, wherein the polarity of said threshold function is inverted when said threshold is exceeded by said received pulse.

6. The method of claim 5 wherein said output signal is a train of logic level output pulses invariant in height with respect to the amplitude of said received pulse and having a frequency equal to said received pulse.

* * * * *